April 11, 1933.     E. E. MOORE     1,903,682
PIE SEALER
Filed March 3, 1931
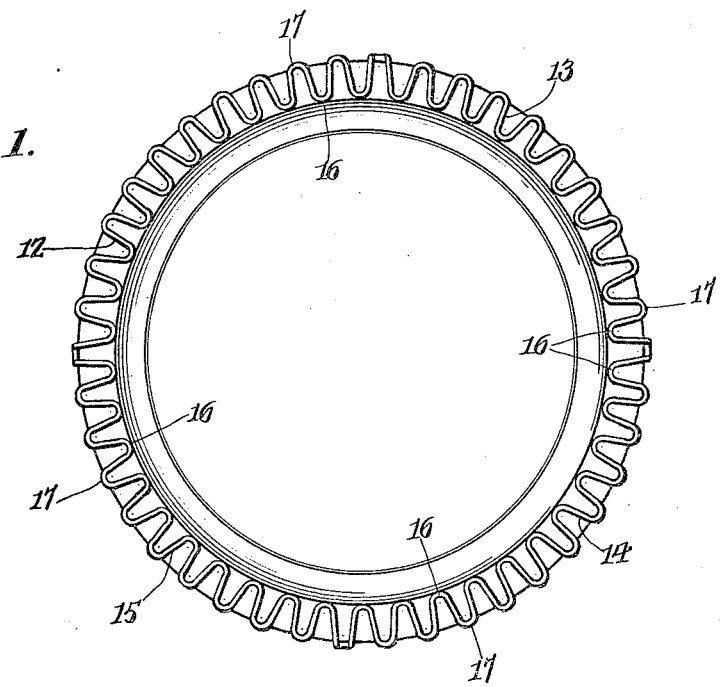
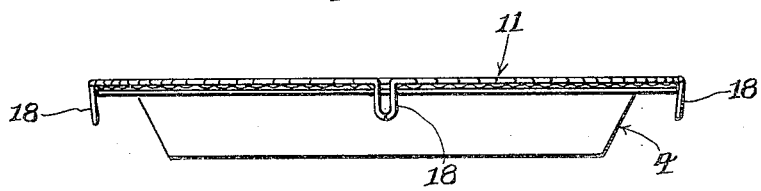
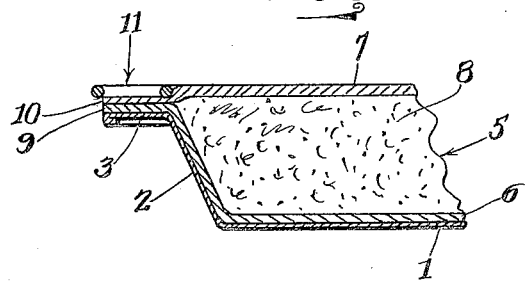
Inventor
Emma E. Moore
By Geo. P. Kimmel
Attorney Patented Apr. 11, 1933

1,903,682

UNITED STATES PATENT OFFICE

EMMA E. MOORE, OF WARREN, OHIO

PIE SEALER

Application filed March 3, 1931. Serial No. 519,875.

This invention relates to a pie sealer and has for its object to provide, in a manner as hereinafter set forth, a device of such class for sealing the marginal portions of the top and bottom crusts of a pie for maintaining such portions in abutting relation to prevent the separation of such crusts and the discharge of the filling between such portions when baking the pie.

Further objects of the invention are to provide, in a manner as hereinafter set forth, a device of the class referred to which is simple in its construction and arrangement, strong, durable, compact, thoroughly efficient in its use, preventing when used the impairing of the upper crust of the pie inwardly of the top edge of the pie pan, including means for effectively latching it in sealing position and inexpensive to manufacture.

With the foregoing and other objects in view, the invention consists of the novel construction, combination and arrangement of parts as hereinafter more specifically described and illustrated in the accompanying drawing wherein is shown an embodiment of the invention, but it is to be understood that changes, variations and modifications can be resorted to which fall within the scope of the invention as claimed.

In the drawing wherein like reference characters denote corresponding parts throughout the several views:

Figure 1 is a top plan view of a flanged top pie pan showing the adaptation therewith of a pie sealer in accordance with this invention.

Figure 2 is a side elevation of a pan containing a pie showing the device mounted in sealing position.

Figure 3 is a fragmentary view in vertical section of a pie pan containing a pie and the sealer in sealing position with respect to the marginal portions of the top and bottom crusts of the pie.

Referring to the drawing in detail, 1 denotes the bottom, 2 the body portion and 3 the outwardly directed flange of a pie pan 4. The top of body portion 2 merges into the flange 2. A pie 5 is arranged in pan 4 and the bottom crust, top crust and filling thereof are indicated respectively at 6, 7 and 8.

The crust 6 has its marginal portion 9 positioned on flange 3. The marginal portion 10 of crust 7 is mounted on marginal portion 9 of crust 6.

The pie sealer in accordance with this invention consists of a flat skeleton annulus formed of oppositely disposed U-shaped sealing parts and a series of latching parts. The sealing parts are arranged in groups separated from each other by endless spaces and connected together by the latching parts. The inner diameter of the annulus is such as to prevent the inner edge projecting inwardly from the top edge of the pan to impair or damage the upper crust of the pie during the baking of the latter. The sealing parts maintain the marginal portions of the crust together in a seal tight manner and also crimp the marginal portion of the upper crust to enhance the appearance of such crust. The latching parts coact with the edge of the pan to securely hold the device in sealing position and to prevent the shifting thereof relative to the pie. The flat skeleton annulus is formed of a length of stock of cylindrical cross section having the ends thereof welded together. The stock can be of any suitable material and of the gauge desired.

The annulus is referred to generally at 11 and is formed from a single length of wire of the desired gauge. Stretches of the wire are bent upon themselves to provide spaced, arcuate groups of a series of oppositely disposed sealing parts or portions and a plurality of latching parts. Preferably the number of groups of sealing parts or portions will be four and are so illustrated. The groups are separated by radially disposed endless spaces. Each group contains a like number of radially disposed, flat, straight sealing parts or portions oppositely disposed with respect to each other and are of U-form. As the sealing parts of each group are oppositely disposed the open end of one part will align with the closed end of an adjacent part. The closed ends of the sealing portions at the outer edge of a group being arranged in an arcuate row. The closed ends of the sealing portions at the inner edge of a group being arranged in an arcuate row and concentric to the arc in which is disposed the closed ends of the sealing portions at the outer edge of the group. The groups are designated 12, 13, 14 and 15. The oppositely disposed U-shaped parts of each group are designated 16, 17. The closed ends of the parts 16 are arranged in alignment. The open ends of parts 16 are arranged in alignment. The closed ends of the parts 17 are arranged in alignment. The open ends of parts 17 are arranged in alignment. Each sealing part extends throughout in the same plane.

One group of sealing parts is connected with an adjacent group by a depending latching part 18 of U-form. One of the arms of the part 18 merges into the outer end of the outer arm of an outer part 16 of one set and the other arm of the part 18 merges into the outer end of the outer arm of an outer part 16 of an adjacent set. The latching parts 18 incline slightly inwardly from their upper to their lower ends and are resilient thereby providing a frictional latch for the sealer when the parts 18 abut the edge of flange 3 as shown in Figure 2. The length of the parts 16, 17 correspond substantially to the width of the flange 3.

What I claim is:—

A pie sealer comprising an annular body formed from a single length of wire having stretches thereof bent upon themselves to provide a plurality of groups of a series of radially disposed, flat U-shaped straight sealing portions and a plurality of resilient U-shaped latching parts angularly disposed with respect to, depending from and corresponding in number to the number of said groups, each of said groups being of arcuate contour, said groups disposed in the same arc, each end of one group being separated from an end of a pair of adjacent groups by radially disposed endless spaces, the sealing portions of each group being oppositely disposed with respect to each other whereby the open end of one sealing portion will align with the closed end of an adjacent sealing portion, the closed ends of the sealing portions at the outer edge of a group being arranged in an arcuate row, the closed ends of the sealing portions at the inner edge of a group being disposed in an arcuate row and concentric to the arc in which is disposed the closed ends of the sealing portions at the outer edge of the group, and each latching part having the arms thereof merging into the outer ends of the opposed ends of a pair of opposed groups of sealing portions.

In testimony whereof, I affix my signature hereto.

EMMA E. MOORE.